March 3, 1964
C. R. RADEY
3,123,018
WALL CONSTRUCTION FOR FREIGHT VEHICLES
AND METHOD OF MAKING THE SAME
Filed July 7, 1959
4 Sheets-Sheet 1
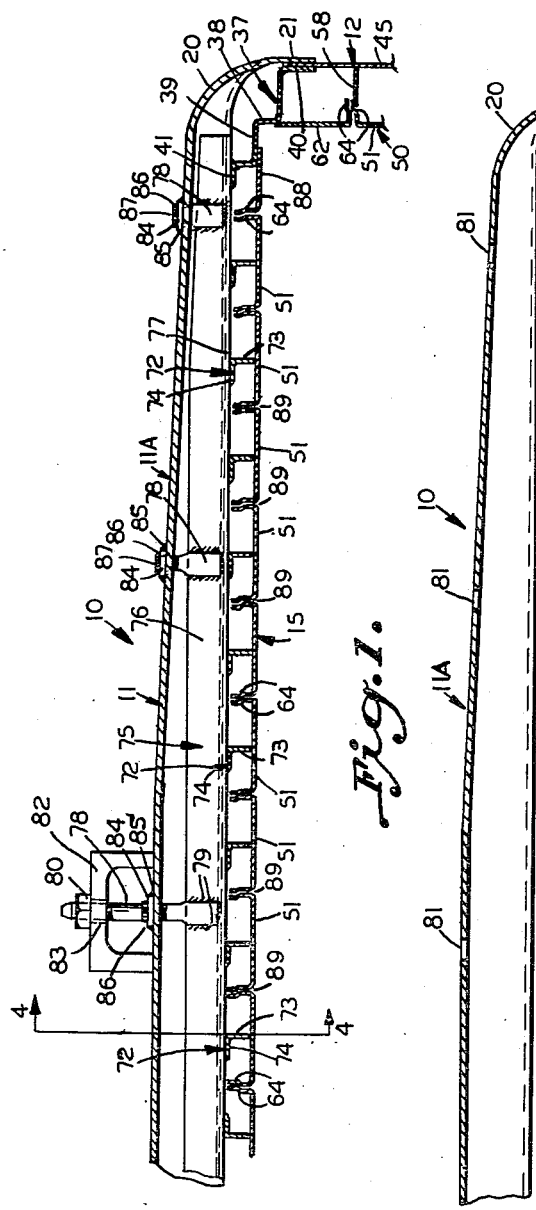
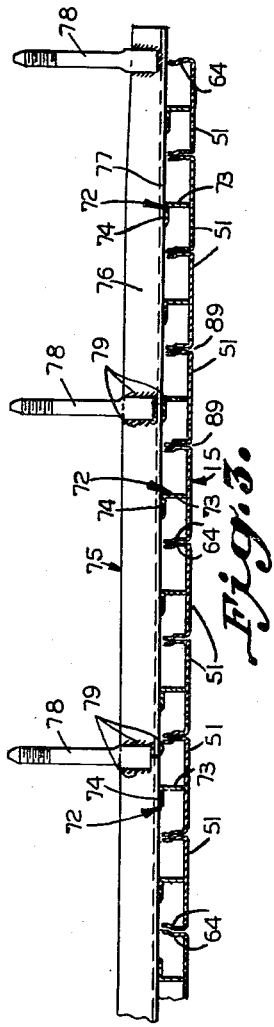
Inventor
Charles R. Radey
By Wayne Morris Russell
Attorney Inventor
Charles R. Radey
By Wayne Morris Russell
Attorney March 3, 1964

C. R. RADEY 3,123,018

WALL CONSTRUCTION FOR FREIGHT VEHICLES
AND METHOD OF MAKING THE SAME

Filed July 7, 1959

Inventor
Charles R. Radey
By Wayne Morris Russell
Attorney

March 3, 1964

C. R. RADEY 3,123,018

WALL CONSTRUCTION FOR FREIGHT VEHICLES
AND METHOD OF MAKING THE SAME

Filed July 7, 1959

Inventor
Charles R. Radey
By Wayne Moris Russell
Attorney

United States Patent Office 3,123,018
Patented Mar. 3, 1964

3,123,018
WALL CONSTRUCTION FOR FREIGHT VEHICLES AND METHOD OF MAKING THE SAME
Charles R. Radey, Michigan City, Ind., assignor to Pullman Incorporated, Chicago, Ill., a corporation of Delaware
Filed July 7, 1959, Ser. No. 825,576
9 Claims. (Cl. 105—423)

This invention relates to a nailable metal wall lining construction for freight vehicles and is directed primarily to a nailable metal wall lining construction for railway box cars.

The invention has for its principal object the provision of a nailable metal wall lining for freight vehicles which meets the requirements as to strength demanded by the heavy duty service to which such vehicles are subjected.

An object of the invention is the provision of preassembled nailable metal wall lining panels for freight vehicles which extend vertically substantially from the floor of the vehicle to adjacent the roof, transversely for the end walls substantially from side wall to side wall of the vehicle and longitudinally for the side walls substantialy from one inside end corner of the vehicle to the nearest side of the side door opening.

Another object is to provide a nailable metal end wall lining comprising a plurality of generally channel shaped section plank members which are fabricated in subassembly into panels each of which substantially covers an end wall area of a freight vehicle and is applied and secured to the end wall structure of the vehicle by means of horizontally disposed fasteners.

A further object comprehends a nailable metal end wall lining comprising a plurality of generally channel shaped section planks disposed in vertical parallel relationship applied and secured to an end wall structure of a freight vehicle including an outer corrugated plate member having a plurality of horizontally disposed corrugations at vertically spaced intervals and extending transversely across the width of the vehicle.

A still further object contemplates a nailable metal side wall lining comprising a plurality of generally channel shaped section plank members which are fabricated in subassembly into panels each of which substantially covers a portion of the side wall area of a freight vehicle extending longitudinally on one side wall substantially from the inside end corner of the vehicle to the nearest side of the side door opening and is secured to and supported by the side wall structure of the vehicle.

Still another object of the invention is to provide preassembled nailable metal wall lining panels which are applied to the structural portions of the side walls and end walls of a freight vehicle in sub-assembly thereby providing complete side wall and end wall units which are applied to the underframe structure and roof structure of the vehicle in the final assembly of the vehicle.

The foregoing and other objects of the invention are attained by the construction and arrangement illustrated in the accompanying drawings wherein FIG. 1 is a horizontal fragmentary sectional view through the end wall of a railway box car type of freight vehicle showing the end wall lining construction of this invention applied and partially secured to the end wall structure;

FIG. 2 is a horizontal fragmentary sectional view through the end wall structure;

FIG. 3 is a horizontal fragmentary sectional view through the end wall lining panel of this invention in ready condition for application to the end wall structure shown in FIG. 2;

Figure 4:
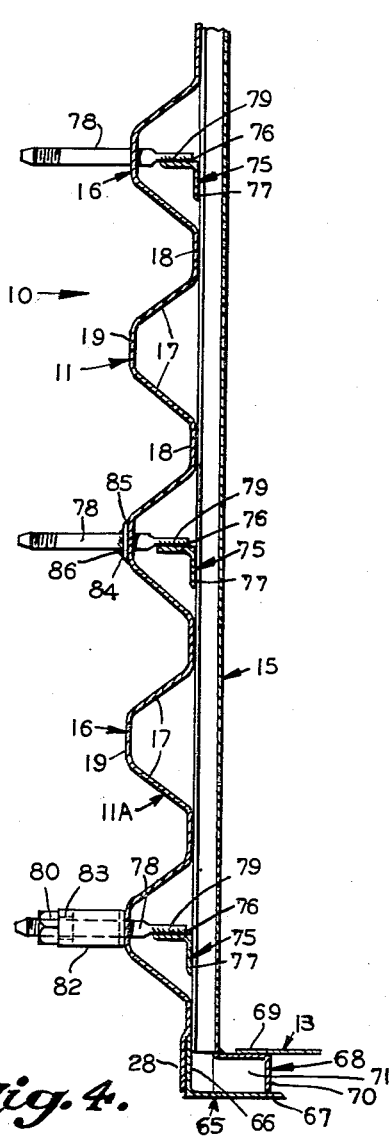
FIG. 4 is a vertical fragmentary sectional view to a larger scale through the lower portion of the end wall taken on line 4—4 in FIG. 1.

In the drawings which show a nailable metal interior lining construction applied to the end and side wall structures of a railway box car type of freight vehicle, 10 represents the vehicle having end walls 11, side walls 12, a floor 13 and a roof 14.

The end wall lining 15 and the side wall lining 50 comprise a plurality of generally channel shaped section metal planks 51 disposed in vertical parallel relationship in the vehicle. The flanges 64 of the channels are disposed outwardly so that the inwardly disposed web portions of the channels are disposed flush to provide smooth surface wall areas. The wall lining planks 51 are the same in all respects regarding the forming and shape of the channel sections as the channel sections of the metal floor planks 20 disclosed in copending application for vehicle floor construction, Serial Number 521,858 now Patent No. 2,910,016, issued October 27, 1959. The adjacent lining planks are spaced apart by means of embossments integral with the channel flanges of the planks and the planks are joined together by welding at these embossments located at spaced intervals along the sides of the planks, this feature also being the same as disclosed in the referred to co-pending application. The lining planks 51 in the present application being the same in shape as the floor planks 20 in the co-pending application and the spacing and joining means of the adjacent planks being the same in both applications, it follows that the nailing groove spaces, including the contour of the grooves, are the same for both the wall lining and the floor construction as further disclosed in co-pending application, Serial Number 521,858. The plank supporting members for the side wall lining 50 differ from the plank supporting members for the end wall lining 15 as hereinafter described.

The structural portion of end wall 11 includes a corrugated outer plate member 11A having a plurality of horizontally disposed corrugations 16 at vertically spaced intervals extending substantially from the underframe to the roof of the vehicle. The corrugations 16 extend transversely the full width of the vehicle and serve as stiffeners thereby providing a rigid construction. The corrugations are of trapezoidal shape in section having side portions 17 in inclined relationship with the inner and outer vertical portions 18 and 19 respectively. The inner portions 18 of the corrugations extend transversely in normal relationship with the side walls 12 and the outer portions 19 are parallel transversely with the inner portions 18 at the center portion of the vehicle. On each side of the center portion the outer portions 19 incline inwardly toward the vehicle thereby varying and decreasing the depth of the corrugations as they approach each side of the vehicle. At the wrap-around portions 20 of the outer plate member 11A at the end corners of the vehicle, the inner and outer portions 18 and 19 of the corrugations converge to form a flat portion 21 which fits against the outside surface of exterior side sheet 45 and is secured to flange 40 of the corner post 37 along with exterior sheet 45 by riveting as hereinafter described. The top corrugations 22 and 23 are progressively smaller in size than the main corrugations 16. The upper flat portion 24 provided at the top of the outer plate member 11A is in vertical alignment with the inner portions 18 of corrugations 16 and terminates with an inwardly directed stiffener flange 25. The end roof sheet 26 of roof 14 includes a depending flange 27 which is applied against the outer surface of the outer plate portion 24 and is secured thereto by riveting. The end wall structure includes an end sill member 65 which is secured to the underframe structure of the vehicle and extends transversely across the width of the vehicle. End sill 65 comprises an angle having an upstanding flange 66 and an inwardly directed horizontal flange 67. A floor support angle 68 having an outwardly directed horizontal flange 69 and a depending flange 70 overlies the end sill angle 65 and is supported and secured thereto by means of a plurality of vertical web plates 71 at transversely spaced intervals across the width of the vehicle and extending between flanges 67 and 69. The lower edge portion 28 of the outer plate member 11A is offset outwardly to fit against the outside surface of upstanding flange 66 of angle 65 and is secured thereto by riveting.

The planks 51 of the end wall lining 15 extend vertically from the top surface of the outwardly directed horizontal flange 69 of angle 68 to a point slightly above the top corrugation 23 of the outer plate member 11A. Cover member 72A extending transversely over the top edge of end lining 15 is secured by welding along its top edge to the inner face of flat portion 24 of the outer plate member and along its bottom edge to the inner faces of the end lining planks 51 to form a seal along the top edge of the end lining 15. The bottom edge of end lining 15 is secured to the outwardly directed horizontal flange 69 of angle 68 by welding along the inner faces of end lining planks 51 to form a seal along the bottom edge thereof. The end lining planks 51 are each supported by means of an intermediate support angle 72 having an inwardly directed flange 73 and an outer transversely directed flange 74. Angles 72 extend continuously full height of the respective planks. The inwardly directed flanges 73 of angles 72 are welded to the outer surfaces of the vertical web portions of the respective planks. The intermediate support angles 72 are secured to a plurality of horizontally disposed support angles 75, each having an outwardly directed flange 76 and a depending flange 77. The support angles 75 extend transversely across the width of end lining 15 and are spaced vertically to fit into alternate corrugations 16. The depending flanges 77 of angles 75 are welded to the transversely directed flanges 74 of angles 72. A plurality of horizontally disposed fasteners 78 at transversely spaced intervals are secured by welding at their inner end portions to each outwardly directed flange 76 of angles 75. The outer end portions of fasteners 78 are threaded to match threaded nuts 80 which are used in the application of the end wall lining 15 to the outer plate member 11A.

Figure 5:
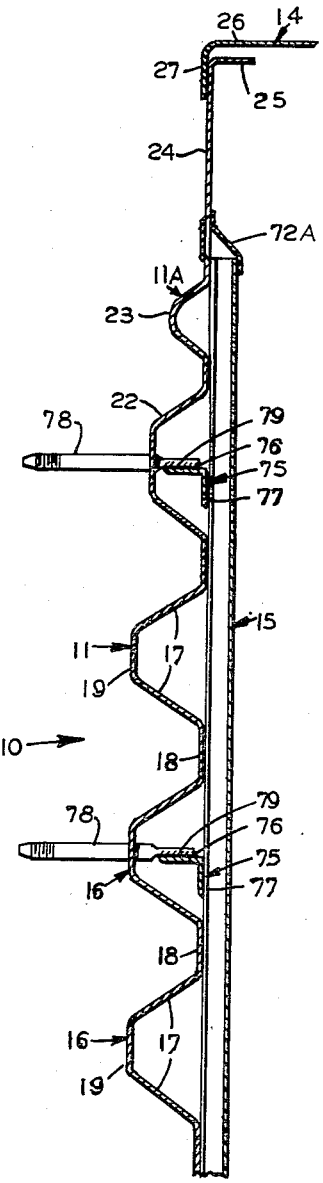
FIG. 5 is a vertical fregmentary sectional view through the upper portion of the end wall also taken on line 4—4 in FIG. 1.
Figure 7:
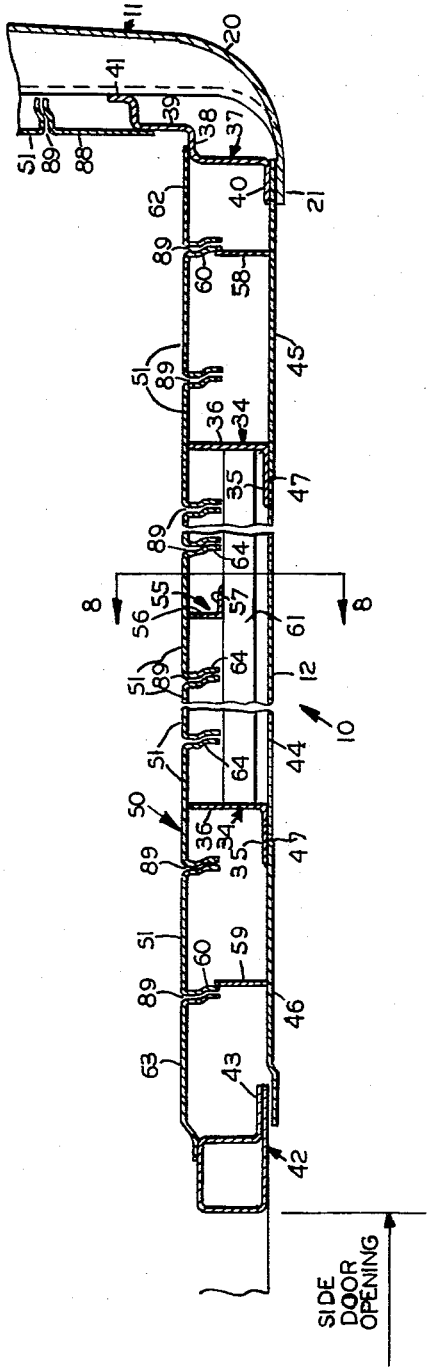
FIG. 7 is a horizontal fragmentary sectional view the same as FIG. 6 to a larger scale.

In the application of the end wall lining 15 to the outer plate member 11A, a panel sub-assembly of the lining is made which substantially covers the entire end wall area of the vehicle, the panel extending transversely from side wall to side wall and vertically from the floor to a point close to the roof. In this assembly the required number of vertically disposed end lining planks 51 are spaced and joined together, the individual intermediate plank support angles 72 having been first applied to the respective planks. The supporting fasteners 78 having been secured to the horizontal support angles 75 at spaced intervals, the support angles are then secured to the intermediate plank support angles 72 at the required vertically spaced intervals which completes the panel sub-assembly as shown in FIG. 3 of the drawings. In the application of this panel to the corrugated outer plate member 11A shown in FIG. 2, the supporting fasteners 78 engage cooperating holes 81 in the outer plate member and after having passed through these holes the fasteners extend outwardly beyond the end wall structure as shown in FIGS. 4 and 5. Holes 81 in the outer plate member 11A are larger than required for receiving the fastener which allows for location variations between the fasteners and the holes and also permits adjustment of the panel after applications to the end wall structure. A bearing clip 84 having a matching fastener hole in center thereof is applied over each supporting fastener 78 as shown in FIGS. 1 and 4. The bearing clips are welded to the end wall structure along their outer edges 85. Also as shown in FIGS. 1 and 4 a channel shape bridge clamp 82 having a fastener engaging hole 83 in the web thereof is applied over the outwardly extending end of each supporting fastener 78. A threaded nut 80 is applied over the end of each fastener adjacent to the bridge clamps 82 after which the nuts are tightened so as to draw the wall lining panel tight against the outer plate member, with contact being made between the outer surfaces of flanges 74 of the vertically disposed intermediate plank support angles 72 and the inner surfaces of the inner portions 18 of the horizontally disposed corrugations 16. After the nuts 80 have been drawn-up tightly the supporting fasteners 78 are welded on the outside to the bearing clips 84 as shown at 86 in FIGS. 1 and 4. The nuts 80 and the channel clamps 82 are then removed and the ends of the supporting fasteners 78 are cut-off beyond the welds 86 in lengths to suit the various conditions resulting from the sloping outside portions 19 of corrugations 16 as shown at 87 in FIG. 1. The end sill angle 65 including the floor support angle 68 having been applied to the outer plate member 11A before the application of the end wall lining to the end wall structure, the lining panel is secured along its bottom edge to flange 69 of the floor support angle 68 and the top cover member 72A is applied and secured along the top edge of the end lining panel to seal the top and bottom edges thereof. This completes the end wall unit for application in the final assembly of the vehicle.

The inwardly directed flanges 73 of the intermediate plank support angles 72 comprise the only supports for the lining planks 51. The outwardly directed flanges 64 of the planks 51 are normally not in supporting contact with the inner portions 18 of corrugations 16. This provides some resilience to the lining and helps to prevent damage to the individual planks when concentrated loads are stored and hauled in the vehicle. So-called loose planks 88 located adjacent to the corner post 37 on each side of the vehicle, each comprising substantially a half section of a regular plank 51, serve as closing pieces in the completion of the application of the end wall lining as hereinafter described. These planks extend vertically and are the same height as the regular end wall lining planks 51. They are secured by welding to the ajacent plank 51 at the flange embossments in the vertical nailing groove on one side of the plank and along the opposite outside vertical edge of the plank to the corner post 37.

If desired, two or more end wall lining panels can be made to extend across the width of the car instead of one panel in which case the horizontally disposed support angles 75 would be cut to suit the width of the panels and welding at the nailing grooves forming the panel joints would be made after the panels are applied to the end structure.

The structural portion of side wall 12 includes a side sill 30 and a side plate 32 each extending longitudinally of the vehicle. The side sill includes an upstanding flange 31 and the side plate a depending flange 33. Corner post 37 at the juncture of side wall 12 and end wall 11 and door post 42 at the sides of the side door opening extend vertically from the side sill 30 to the side plate 32. The corner post 37 includes a longitudinally directed web 38 for attachment of the side wall lining, a transversely directed web 39 for attachment of the end wall lining, a longitudinally directed flange 40 for attachment of the side wall structure 12 and the end wall structure 11 and a transversely directed flange 41 for attachment of the end wall structure 11. The side door post 42 includes a longitudinally directed flange 43 for attachment of the side wall structure 12. Flanges 40 and 43 of the corner post 37 and the door post 42 respectively are offset inwardly at the upper and lower end portions of the posts to fit against the inside surfaces of the depending flange 33 of side plate 32 and the upstanding flange 31 of side sill 30 and are secured thereto by riveting. Angle side posts 34 likewise extend vertically from the side sill 30 to the side plate 32 and are secured by welding at their upper end portions to depending flange 33 and at their lower end portions to upstanding flange 31. The posts 34 are spaced longitudinally of the vehicle at intervals between the corner posts 37 and the nearest side door post 42 at all four corners of the vehicle and each post having an outer longitudinally directed flange 35 and an inwardly directed flange 36. The exterior side sheets 44, 45 and 46 extend vertically from the upstanding flange 31 of side sill to the depending flange 33 of side plate and are disposed adjacent to each other longitudinally of the vehicle with a butt joint at each side post. The sheets are applied against the vertically aligned outer surfaces of post flanges 35, 40 and 43 and depending flange 33 of side plate 32 and upstanding flange 31 of side sill 30. The adjacent vertical edges of the side sheets are connected together and secured to the angle side post flanges 35 by means of butt-welded joints 47. The end side sheet 45 terminates at flange 40 of the corner post 37 and is secured thereto by riveting along with the wrap around flat portion 21 of outer plate member 11A. The opposite end side sheet 46 terminates at flange 43 of the door post 42 and is secured thereto also by riveting. The upper and lower horizontal edges of the side sheets are secured to the depending flange 33 of side plate 32 by fillet weld 48 and to the upstanding flange 31 of side sill 30 by fillet weld 49.

The planks 51 of the side wall lining 50 extend from a point above the floor 13 a point below the side plate 32 providing horizontal slot openings 52 above the top edge of the lining construction and 53 below the bottom edge thereof for drainage of granular materials. The floor grain strip member 54 extends longitudinally underlying the lower edge of wall lining 50 thereby forming the bottom of drainage slot 53. The inwardly directed flanges 36 of the angle side posts 34 serve as intermediate plank support members with additional intermediate support angles 55 provided at the planks intermediate the posts 34. The intermediate plank support members 55 extend continuously full height of the respective planks. The inwardly directed flanges 56 of the plank support members 55 and flanges 36 of the angle side posts 34 are secured to the web portions of the respective planks by welding. Plate 58 supports the end lining plank closely adjacent to the door post 42 and plate 59 supports the end lining plank closely adjacent to the corner post 37. Plates 58 and 59 extend continuously full height of the respective planks and are secured to the end outwardly directed flanges 60 of the planks by welding and to the side sheets 45 and 46 respectively also by welding. The horizontally disposed support bars 61 extend in each space between the inwardly directed flanges 36 of the angle posts to provide back-up supports for the lining planks. The ends of the support bars 61 are secured to the post flanges 36 by welding and the outer longitudinally directed flanges 57 of the lining plank support angles 55 are secured to the inwardly facing surfaces of the support bars 61 also by welding. The inwardly directed flanges 36 and 56 of the angle side posts 34 and the lining plank support angles 55 comprise the only supports for the lining planks 51. The outwardly directed flanges 64 of planks are normally not in supporting contact with the support bars 61. This provides some resilience to the lining and helps to prevent damage to the individual planks when concentrated loads are stored and hauled in the vehicle. So-called loose planks 62 located adjacent to the corner posts 37 and 63 located adjacent to the door post 42, each comprising substantially a half section of a regular plank 51, serve as closing pieces in the fabrication of the lining construction as hereinafter described. These planks extend vertically and are the same height as the regular side lining planks 51. They are secured by welding to the adjacent plank 51 at the flange embossments in the vertical nailing groove on one side of the plank and along the opposite outside vertical edge of the plank to the corner post 37 for plank 62 and to the door post 42 for plank 63.

Figure 6:
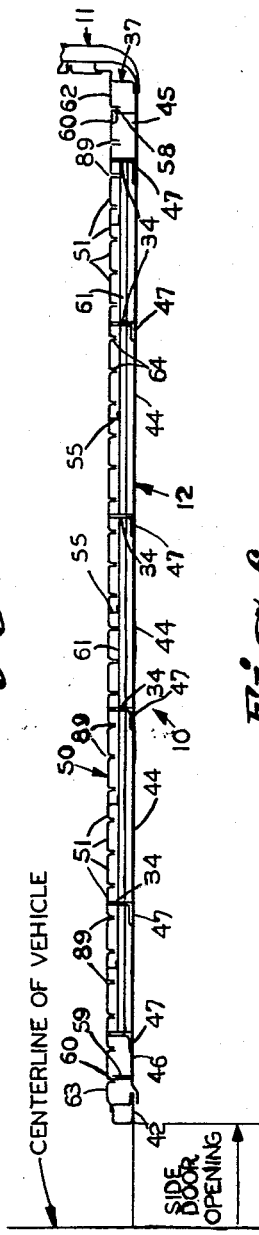
FIG. 6 is a horizontal sectional view through one-half of one side wall of the vehicle showing the side wall lining construction of this invention applied to the side wall structure.
Figure 8:
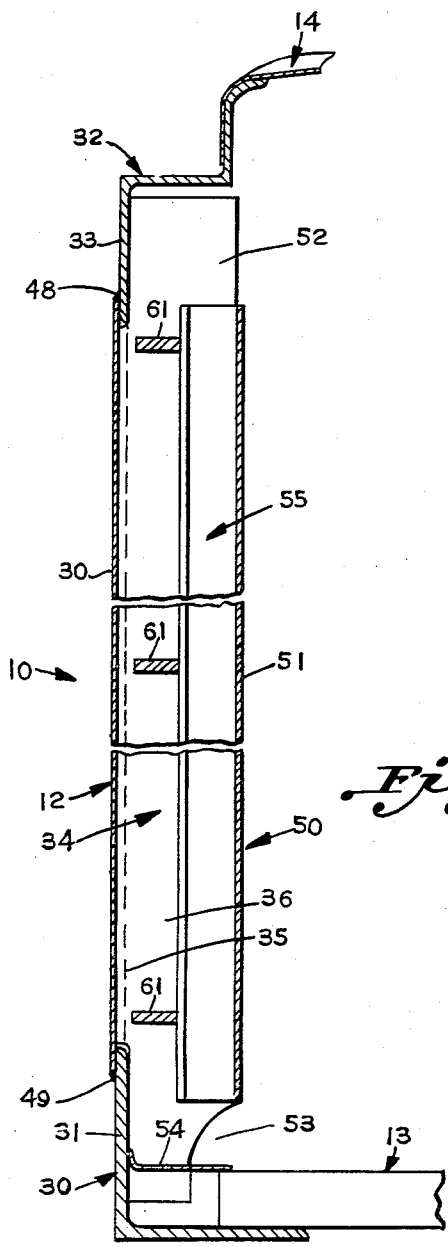
FIG. 8 is a vertical fragmentary sectional view through the side wall taken on line 8—8 in FIG. 7.

In the application of the side wall lining 50, panel subassemblies are made, each of which substantially covers one quarter of the side wall area in the vehicle, each panel extending vertically from a point above the floor to a point below the side plate and longitudinally from one end corner of the vehicle to the nearest side door post of the centrally located door opening as shown in FIG. 6 of the drawings. In each of the assemblies the required number of vertically disposed side lining planks 51 are spaced and joined together, the individual intermediate plank support angles 55 and the angle side posts 34 having been first applied to the respective planks. The horizontal support bars 61 are then applied at vertically spaced intervals in the respective spaces between the angle side posts. Complete side wall assemblies extending longitudinally from end to end of the vehicle are then made by applying the side plate 32 and the side sill 30 to two of the panel assemblies, the panel assemblies being located in opposed longitudinal direction each extending inwardly from opposing ends of the side plate and the side sill to define a centrally located door opening. The corner posts 37 and the door posts 42 are then applied and partially secured to the side wall structure after which application is made of the exterior side sheets 44, 45 and 46 and the end plank supporting plates 58 and 59 are welded in place. This completes the side wall unit for application in the final assembly of the vehicle.

In the final assembly of the vehicle the two required side wall units are first applied to the underframe structure, one on each side of the vehicle, after which application is made of the two required end wall units, one at each end. In each case the individual side and end wall units include the nailable metal wall linings which have been applied in sub-assembly using the methods as herein described. The balance of the riveting and welding required to complete the attachment of the corner posts 37 to the side and end wall units and the door posts 42 to the side wall units is then made after which the loose lining planks 62 and 63 on the side walls and 88 on the end walls are applied to complete the application of the wall linings in the vehicle.

The nailing grooves 89 may be filled with a mastic or gummy material for sealing purposes if desired.

From the foregoing it will be seen that the invention provides a nailable metal lining construction which is applied to the wall structures of freight vehicles using methods of application which are practical and meet the strength requirements demanded in heavy duty freight service.

What is claimed is:

1. An integral end wall unit of a freight vehicle having an underframe and roof comprising a corrugated outer plate member having horizontally disposed corrugations at vertically spaced intervals extending substantially from the underframe to the roof of the vehicle and across the major portion of the width of the vehicle, certain of said corrugations having inner surface areas disposed in substantially co-planer relation defining the inner plane of the member and certain of said corrugations having outer surface areas disposed in substantially co-planar relation defining the outer plane of the member, and a nailable metal end wall lining panel substantially coextensive in area with said outer plate member, said end wall lining panel including a plurality of vertical planks of substantially channel section and fixed in side-by-side relationship, said planks each having fixed thereto a vertically extending angle member to provide said panel with a plurality of horizontally spaced apart vertically extending angle members, a plurality of vertically spaced apart horizontally extending angle members welded to and outwardly extending from said vertically extending angle members and disposed within at least some of the corrugations of said outer plate member, a plurality of fasteners welded to and outwardly extending from said horizontally extending members, said panel being engaged with said outer plate member with said vertically extending support members contacting at least some of the inner surface areas of the outer plate member, and with said fasteners projecting through holes in the outer plate member, the outer ends of said fasteners being substantially flush with the outer plane of the outer plate member and being secured to said member by welding.

2. An integral end wall unit of a freight vehicle having an underframe and roof comprising a corrugated outer plate member having horizontally disposed corrugations at vertically spaced intervals extending substantially from the underframe to the roof of the vehicle and across the major portion of the width of the vehicle, certain of said corrugations having inner surface areas disposed in substantially co-planar relation defining the inner plane of the member and certain of said corrugations having outer surface areas disposed in substantially co-planar relation defining the outer plane of the member, and a nailable metal end wall lining panel substantially co-extensive in area with said outer plate member, said end wall lining including a plurality of vertical planks of substantially channel section and fixed in side-by-side relationship, said planks each having fixed thereto a vertically extending angle member to provide said panel with a plurality of horizontally spaced apart vertically extending angle members, a plurality of vertically spaced apart horizontally extending angle members welded to said vertical support members, and a plurality of fasteners fixedly secured to and outwardly extending from said horizontal support members, said panel being engaged with said outer plate member with said vertically extending support members contacting at least some of the inner surface areas of the outer plate member, with said horizontal support members disposed within certain of the corrugations of said outer plate member, and with said fasteners projecting through holes in the outer plate member, the outer ends of said fasteners being substantially flush with the outer plane of the outer plate member and being secured to said member by welding.

3. The method of fabricating an integral end wall unit of a freight vehicle having an underframe and roof comprising providing a corrugated outer plate member having horizontally disposed corrugations at vertically spaced intervals extending substantially from the underframe to the roof of the vehicle and across the major portion of the width of the vehicle, certain of said corrugations having inner surface areas disposed in substantially co-planar relation defining the inner plane of the member and certain of said corrugations having outer surface areas disposed in substantially co-planar relation defining the outer plane of the member, providing a nailable metal end wall lining panel substantially coextensive in area with said outer plate member having vertically extending outwardly directed support members and a plurality of threaded fasteners outwardly extending from said panel, applying said panel to said outer plate member with said vertically extending support members engaged with at least some of the inner surface areas of the outer plate member and with said fasteners projecting through holes in the outer plate member, applying perforated channel shaped clips over the projecting ends of the fasteners and threading nuts onto the end portions of the fasteners projecting through the clips, tightening the nuts to draw the lining panel against the outer plate member, welding the fasteners to the outer plate member, removing the nuts and clips, and then cutting off the projecting portions of the fasteners adjacent the contiguous area of the outer plate member.

4. The method of fabricating an integral end wall unit of a freight vehicle having an underframe and roof comprising providing a corrugated outer plate member having horizontally disposed corrugations at vertically spaced intervals extending substantially from the underframe to the roof of the vehicle and across the major portion of the width of the vehicle, certain of said corrugations having inner flat surfaced areas disposed in substantially co-planar relation defining the inner plane of the member and certain of said corrugations having outer surface areas disposed in substantially co-planar relation defining the outer plane of the member, providing a nailable metal end wall lining panel substantially coextensive in area with said outer plate member having vertically extending outwardly directed support angles each having a laterally extending flange at its outer edge and providing a plurality of threaded fasteners outwardly extending from said panel, applying said panel to said outer plate member with the flanges of said vertically extending support angles engaged with at least some of the inner flat surfaced areas of the outer plate member and with said fasteners projecting through holes in the outer surface areas of the outer plate member, applying perforated channel shaped clips over the projecting ends of the fasteners and threading nuts onto the end portions of the fasteners projecting through the clips, tightening the nuts to draw the lining panel against the outer plate member, welding the fasteners to the outer surface areas of the outer plate member, removing the nuts and clips, and then cutting off the projecting portions of the fasteners adjacent the outer plane of the outer plate member.

5. The method of fabricating an integral end wall unit of a freight vehicle having an underframe and roof comprising providing a corrugated outer plate member having horizontally disposed corrugations at vertically spaced intervals extending substantially from the underframe to the roof of the vehicle and across the major portion of the width of the vehicle, certain of said corrugations having inner flat surfaced areas disposed in substantially co-planar relation defining the inner plane of the member and certain of said corrugations having outer flat surfaced areas disposed in substantially co-planar relation defining the outer plane of the member, providing a nailable metal end wall lining panel substantially coextensive in area with said outer plate member having vertically extending outwardly directed support angles each having a laterally extending flange at its outer edge and said panel having vertically spaced apart horizontal support members outwardly extending from said vertical support members and a plurality of threaded fasteners outwardly extending from said horizontal support members, applying said panel to said outer plate member with the flanges of said vertically extending support angles engaged with at least some of the inner flat surfaced areas of the outer plate member, with said horizontal support members disposed within certain of the corrugations of said outer plate member, and with said fasteners projecting through holes in the outer surface areas of the outer plate member, applying perforated channel shaped clips over the projecting ends of the fasteners and threading nuts onto the end portions of the fasteners projecting through the clips, tightening the nuts to draw the lining panel against the outer plate member, welding the fasteners to the outer flat surfaced areas of the outer plate member, removing the nuts and clips, and then cutting off the projecting portions of the fasteners adjacent the outer plane of the outer plate member.

6. In a freight vehicle having a side wall including a door opening, a plurality of vertically disposed side post members at longitudinally spaced intervals between each end of said wall and the nearest side of said door opening, said side posts each including an inwardly directed flange extending full height of said side wall, a plurality of horizontally disposed support members at vertically spaced intervals in each space between said side posts, said support members each extending between and secured at its ends to said inwardly directed flanges of said side posts and each having an inwardly facing surface, a nailable metal lining for said side wall including pre-assembled panels, said panels comprising a plurality of generally channel shaped section planks disposed in vertical parallel relationship on said side wall and having the flanges of said planks disposed outwardly with the inwardly disposed web portions of said planks disposed flush to provide smooth surface wall areas, said flanges of said planks having spacer means separating opposing flanges on adjacent planks forming nailing grooves between said adjacent planks, said pre-assembled panels each extending vertically substantially full height of said side wall and longitudinally substantially from one end of said wall to the nearest side of said door opening, said inwardly directed flanges of said side posts being secured respectively on the outer surface of the web portion of certain of said lining planks thereby supporting said pre-assembled panels, a vertically disposed support member at each lining plank intermediate said side posts, said support members extending full height of said planks and each having an inwardly facing surface secured to the outer surface of the web portion of each said intermediate plank and an outwardly facing surface secured to the inwardly facing surfaces of said horizontal support members between said side posts.

7. In a freight vehicle having an end wall including an outer corrugated plate member having a plurality of horizontally disposed corrugations at vertically spaced intervals extending transversely full width of said vehicle, a nailable metal lining for said end wall including a pre-assembled panel, said panel comprising a plurality of generally channel shaped section planks disposed in vertical parallel relationship on said end wall and having the flanges of said planks disposed outwardly toward the inner side of said outer corrugated plate member with the inwardly disposed web portions of said planks disposed flush to provide a smooth surface wall area, said flanges of said planks having spacer means separating opposing flanges on adjacent planks forming nailing grooves between said adjacent planks, said pre-assembled panel extending vertically substantially full height of said end wall and transversely substantially full width of said wall, a vertically disposed support member at each lining plank, said support members extending full height of said planks and each having an inwardly facing surface secured to the outer surface of the web portion of each said plank and an outwardly facing surface, a plurality of horizontally disposed support members at vertically spaced intervals corresponding with spacing of alternate corrugations of said outer corrugated plate member and extending transversely across the width of said lining panel, said horizontal support members each having an inwardly facing surface secured to said outwardly facing surfaces of said vertical support members and an upwardly facing surface, a plurality of horizontally disposed fasteners at transversely spaced intervals across the width of said panel at each said horizontal support member, said fasteners secured at their inner end portions to said upwardly facing surfaces of said horizontal support members and extending outwardly through cooperating holes in the outer vertical portions of said alternate corrugations of said corrugated plate member, said fasteners being secured at their outer end portions to the outer surfaces of said outer vertical portions of said alternate corrugations with the outwardly facing surfaces of said vertical plank support members in supporting contact with the inner surfaces of the inner vertical portions of the corrugations of the corrugated plate member.

8. In a freight vehicle having side walls and end walls, said side walls each having a door opening centrally located longitudinally of the vehicle, a plurality of vertically disposed side post members at longitudinally spaced intervals between each end corner of the vehicle and the nearest side of said door opening, said side posts each including an inwardly directed flange extending full height of said side walls, a plurality of horizontally disposed support members at vertically spaced intervals in each space between said side posts, said support members each extending between and secured at its ends to said inwardly directed flanges of said side posts and each having an inwardly facing surface, said end walls each including a vertical outer plate member having outer portions and a plurality of vertically spaced horizontal inner portions, said outer member extending transversely full width of said vehicle, and said inner portions each having an inwardly facing surface, a nailable metal lining for said vehicle including pre-assembled panels on said side walls and end walls respectively, said panels comprising a plurality of generally channel shaped section planks disposed in vertical parallel relationship in the vehicle and having the flanges of said planks disposed outwardly with the inwardly disposed web portions of said planks disposed flush to provide smooth surface wall areas, said flanges of said planks having spacer means separating opposing flanges on adjacent planks forming nailing grooves between said adjacent planks, said pre-assembled side wall panels each substantially covering one-quarter of the side wall area of the vehicle and said end wall panels each substantially covering an end wall area of the vehicle, said side wall and end wall panels extending vertically substantially full height of said side walls and end walls respectively, said inwardly directed flanges of said side posts secured respectively on the outer surface of the web portion of certain of said side wall lining planks by welding thereby supporting said pre-assembled side wall panels, said outwardly disposed flanges of said side wall lining planks being normally spaced from the inwardly facing surfaces of said horizontal support member and being in supporting contact at their outer end edges with the inwardly facing surfaces of said horizontal support members when horizontal concentrated loads are applied against said side wall panels between said side posts, a vertically disposed support member at each end wall lining plank, said support members extending full height of said planks and each having an inwardly facing surface secured to the outer surface of the web portion of each said plank by welding and an outwardly facing surface, a plurality of horizontally disposed support members at vertically spaced intervals with each support member located intermediate said horizontal inner portions of said outer plate member and extending transversely across the width of said end wall lining panels, said horizontal support members each having an inwardly facing surface secured to said outwardly facing surfaces of said vertical support members by welding and an upwardly facing surface, a plurality of horizontally disposed fasteners at transversely spaced intervals across the width of said end wall lining panels at each said horizontal support member, said fasteners secured at their inner end portions to said upwardly facing surfaces of said horizontal support members by welding and extending outwardly through cooperating holes in the outer plate member, said fasteners secured at their outer end portions to the outer surface of said outer plate member by welding with the outwardly facing surfaces of said vertical plank support members in supporting contact with the inwardly facing surfaces of said horizontal inner portions of said outer plate member.

9. In a freight vehicle having side walls and end walls, said side walls each having a door opening centrally located longitudinally of the vehicle, a vertically disposed door post member at each side of said door openings, a vertically disposed corner post member at each end corner of the vehicle, a plurality of vertically disposed side post members at longitudinally spaced intervals between each said corner post and the nearest door post, said side posts each including an inwardly directed flange extending full height of said side wall, a plurality of horizontally disposed support members at vertically spaced intervals in each space between said side posts, said support members each extending between and secured at its ends to said inwardly directed flanges of said side posts and each having an inwardly facing surface, said end walls each including an outer corrugated plate member having a plurality of horizontally disposed corrugations at vertically spaced intervals extending transversely full width of said vehicle, a nailable metal lining for said vehicle including pre-assembled panels on said side walls and end walls respectively, said panels comprising a plurality of generally channel shaped section planks disposed in vertical parallel relationship in the vehicle and having the flanges of said planks disposed outwardly with the inwardly disposed web portions of said planks disposed flush to provide smooth surface wall areas, said flanges of said planks having spacer means separating opposing flanges on adjacent planks forming nailing grooves between said adjacent planks, said pre-assembled side wall panels each substantially covering one-quarter of the side wall area of the vehicle and said end wall panels each substantially covering an end wall area of the vehicle, said side wall and end wall panels extending vertically substantially full height of said side walls and end walls respectively, said inwardly directed flanges of said side posts being secured respectively on the outer surface of the web portion of certain of said side wall lining planks thereby supporting said pre-assembled side wall panels, a vertically disposed support member at each side wall lining plank intermediate said side posts, said support members extending full height of said planks and each having an inwardly facing surface secured to the outer surface of the web portion of each said intermediate plank and an outwardly facing surface secured to the inwardly facing surfaces of said horizontal support members between said side posts, a vertically disposed support member at each end wall lining plank, said support members extending full height of said planks and each having an inwardly facing surface secured to the outer surface of the web portion of each said plank and an outwardly facing surface, a plurality of horizontally disposed support members at vertically spaced intervals corresponding with spacing of alternate corrugations of said outer corrugated plate member and extending transversely across the width of said end wall lining panels, said horizontal support members each having an inwardly facing surface secured to said outwardly facing surfaces of said vertical support members and an upwardly facing surface, a plurality of horizontally disposed fasteners at transversely spaced intervals across the width of said end wall lining panels at each said horizontal support member, said fasteners secured at their inner end portions to said upwardly facing surfaces of said horizontal support members and extending outwardly through cooperating holes in the outer vertical portions of said alternate corrugations of said corrugated plate member, said fasteners being secured at their outer end portions to the outer surfaces of said outer vertical portions of said alternate corrugations with the outwardly facing surfaces of said vertical plank support members in supporting contact with the inner surfaces of the inner vertical portions of the corrugations of the corrugated plate member, vertical closing strips between said corner posts and the vertical edges of said side wall and end wall lining panels respectively and between said door posts and the vertical edges of said side wall lining panels.

References Cited in the file of this patent
UNITED STATES PATENTS

| | | |
|---|---|---|
| 1,656,688 | Wright | Jan. 17, 1928 |
| 1,995,532 | Blest et al. | Mar. 26, 1935 |
| 2,300,449 | Rowe | Nov. 3, 1942 |
| 2,316,696 | Johnston | Apr. 13, 1943 |
| 2,480,789 | Swanson | Aug. 30, 1949 |
| 2,591,006 | Radey | Apr. 1, 1952 |
| 2,667,243 | Fenske | Jan. 26, 1954 |
| 2,823,624 | Swann | Feb. 18, 1958 |
| 2,885,972 | Peterson | May 12, 1959 |
| 2,907,417 | Doerr | Oct. 6, 1959 |
| 2,910,016 | Faverty et al. | Oct. 27, 1959 |